(12) United States Patent  (10) Patent No.: US 7,983,206 B2
Tian  (45) Date of Patent: Jul. 19, 2011

(54) INTEGRATED SYSTEM AND METHOD FOR INTERACTIVE COMMUNICATION AND MULTIMEDIA SUPPORT IN VEHICLES

(75) Inventor: Yuan Tian, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 11/900,085

(22) Filed: Sep. 10, 2007

(65) Prior Publication Data

US 2009/0067449 A1 Mar. 12, 2009

(51) Int. Cl.
*H04H 1/00* (2006.01)
*H04J 3/24* (2006.01)
*H04Q 7/00* (2006.01)
*H04L 12/28* (2006.01)
*H04L 12/56* (2006.01)
*H04J 3/16* (2006.01)
*H04J 3/22* (2006.01)
*H04B 1/034* (2006.01)
*G01C 22/00* (2006.01)
*G06F 19/00* (2006.01)

(52) U.S. Cl. ........ 370/312; 370/328; 370/390; 370/467; 701/24; 701/36; 455/99; 455/100

(58) Field of Classification Search .................. 370/310, 370/312, 328, 390, 464, 465, 466, 467, 901; 370/908, 913
See application file for complete search history.

(56) References Cited

U.S. PATENT DOCUMENTS

| 6,055,478 | A | 4/2000 | Heron |
| 6,366,840 | B1 | 4/2002 | Buckley |
| 6,409,242 | B1 | 6/2002 | Chang |
| 6,678,892 | B1 | 1/2004 | Lavelle et al. |
| 6,876,642 | B1 * | 4/2005 | Adams et al. ................. 370/338 |
| 7,190,798 | B2 | 3/2007 | Yasuhara |
| 2002/0196912 | A1 | 12/2002 | Norris |
| 2003/0053638 | A1 | 3/2003 | Yasuhara |
| 2003/0120826 | A1 | 6/2003 | Shay |

(Continued)

FOREIGN PATENT DOCUMENTS

DE 10141190 4/2003

(Continued)

OTHER PUBLICATIONS

Akio Nezu and Wolfgang Wiewesiek, Networking Standards Enable In-Vehicle Video Entertainment and Information Systems, dated Aug. 25, 2006, pp. 1-6 of website, http://www.audiodesignline.com/showArticle.jhtml; jsessionid=14ERL20KGMFRSQSND . . . dated Apr. 17, 2007.

(Continued)

*Primary Examiner* — Seema Rao
*Assistant Examiner* — Xavier Szewai Wong
(74) *Attorney, Agent, or Firm* — Michael Best & Friedrich LLP

(57) ABSTRACT

An integrated system for interactive communication and multimedia support in a vehicle. The system includes a plurality of peripheral devices and a central control unit. Each of the peripheral devices is configured to be installed in the vehicle. The central control unit is also configured to be installed in the vehicle and has a communication interface. The communication interface includes first and second communication platforms and communicates with the plurality of peripheral devices via at least one of the first and second communication platforms. Each communication platform is configured to support bi-directional and selective communication between each of the peripheral devices.

15 Claims, 4 Drawing Sheets

U.S. PATENT DOCUMENTS

| | | |
|---|---|---|
| 2003/0216149 A1* | 11/2003 | Edwards et al. ............ 455/550.1 |
| 2004/0056890 A1* | 3/2004 | Hao et al. ....................... 345/744 |
| 2004/0093155 A1* | 5/2004 | Simonds et al. .............. 701/200 |
| 2004/0185842 A1* | 9/2004 | Spaur et al. .................... 455/420 |
| 2004/0227696 A1 | 11/2004 | Schedivy |
| 2005/0032500 A1 | 2/2005 | Nashif et al. |
| 2005/0039208 A1 | 2/2005 | Veeck et al. |
| 2005/0099548 A1 | 5/2005 | Vitito |
| 2005/0235326 A1 | 10/2005 | Vitito |
| 2005/0249357 A1 | 11/2005 | Schedivy |
| 2005/0251833 A1 | 11/2005 | Schedivy |
| 2006/0048196 A1 | 3/2006 | Yau |
| 2006/0107295 A1 | 5/2006 | Margis et al. |
| 2006/0119748 A1 | 6/2006 | Vitito |
| 2006/0128474 A1 | 6/2006 | Vitito |
| 2006/0128475 A1 | 6/2006 | Vitito |
| 2006/0128476 A1 | 6/2006 | Vitito |
| 2006/0148574 A1 | 7/2006 | Vitito |
| 2006/0148575 A1 | 7/2006 | Vitito |
| 2006/0148576 A1 | 7/2006 | Vitito |
| 2006/0181982 A1 | 8/2006 | Villevieille et al. |
| 2006/0212179 A1 | 9/2006 | Philips et al. |
| 2006/0238321 A1 | 10/2006 | Chen |
| 2008/0046172 A1* | 2/2008 | Ames et al. .................... 701/208 |
| 2010/0100310 A1* | 4/2010 | Eich et al. ...................... 701/201 |

FOREIGN PATENT DOCUMENTS

| | | |
|---|---|---|
| EP | 1058220 | 12/2000 |
| EP | 1369306 | 12/2003 |
| KR | 20030018353 | 3/2003 |

OTHER PUBLICATIONS

Audiovox Launches 'Versatile Video'—And Unveils New Marketing Strategy for Mobile Video Entertainment, published on Jan. 1, 2004, pp. 1-4 of website, http://news.thomasnet.com/fullstory/450036 dated Apr. 17, 2007.

Search Report and Written Opinion for International Application No. PCT/US2008/073656, 17 pages, Dated Feb. 17, 2009.

* cited by examiner

INTEGRATED SYSTEM AND METHOD FOR INTERACTIVE COMMUNICATION AND MULTIMEDIA SUPPORT IN VEHICLES

BACKGROUND

Embodiments of the invention relate to systems and methods for interactive communication and multimedia support in vehicles.

The increasing availability of wireless connections allows individuals to exchange and share more information on-demand. The majority of the information being exchanged and shared includes multimedia content such as music, video, pictures, driving directions, television shows, community service information, and the like. Such information exchange and sharing generally requires, in addition to availability of connections, seamless network connectivity.

Although both wired and wireless connections in vehicles are available, in-vehicle wired and wireless connections are generally limited to devices having the same types of communication protocols or platforms. In other words, some devices may be unable to communicate directly with some other devices. For example, a digital camera or camcorder equipped with an IEEE 1394 port may be unable to directly communicate with a personal-digital-assistant ("PDA") equipped with Bluetooth due to the incompatibility of the respective communication platforms.

SUMMARY

Embodiments of the invention provide an interface control system that allows direct communication between a plurality of multimedia devices having different communication platforms in a vehicle. For example, aftermarket and original equipment multimedia devices operating on different communication platforms can communicate through the interface control system. In addition, incompatible devices can communicate with each other through the interface control system. During such communications it is possible for one device to browse the contents stored in another device, and upload or download contents to or from the system or other devices in the system.

In one embodiment, the invention provides an interface control system that is capable of external communication, and supports a plurality of wired and wireless communication technologies including, but not limited to, WiFi, WiMax, cellular, and satellite networks. As a result, the interface control system can provide various services such as driving directions, vehicle-to-vehicle, vehicle-to-roadside, and vehicle-to-infrastructure information exchanges. With the interface control system, users in a moving vehicle can stay connected to external networks. For example, a system unit or device in a moving vehicle can send an external network access request to external networks through a central unit in the vehicle. As such, users in a moving vehicle can conduct normal online activities either through a human-machine-interface ("HMI") or a portable device in the vehicle. Similarly, users of a moving vehicle can also interact with users in neighboring vehicles via devices in the vehicles.

In another embodiment, the invention provides an integrated system for interactive communication and multimedia support in a vehicle. The system includes a plurality of peripheral devices and a central control unit. Each of the peripheral devices is configured to be installed in the vehicle. The central control unit is also configured to be installed in the vehicle and has a communication interface. The communication interface includes first and second communication platforms and communicates with the plurality of peripheral devices via at least one of the first and second communication platforms. Each communication platform is configured to support bi-directional and selective communication between each of the peripheral devices.

In yet another embodiment, the invention provides a method of interactively communicating between peripheral devices having respective first and second different communication platforms with an interface unit operable to support first and second communication platforms in a vehicle. The method includes establishing a first connection between one of the first and second communication platforms on the interface unit and one of the peripheral devices, and establishing a second connection between another one of the first and second communication platforms on the interface unit and another one of the peripheral devices, wherein the first and second platforms are different. The method also includes transmitting a signal from the one of the peripheral devices to the interface unit via the first connection, selectively transmitting at least a portion of the signal from the interface unit to the another one of the peripheral devices via a second connection, and receiving the at least a portion of the signal at the another one of the peripheral devices with the second connection. The method also includes receiving another signal from the another one of the peripheral devices with the second connection in response to the at least a portion of the signal, and selectively transmitting at least a portion of the another signal from the interface unit to the one of the peripheral devices with the first connection.

In still another embodiment, the invention provides an integrated system for interactive communication and multimedia support in a vehicle, where the system includes first and second peripheral devices and a communication interface. The first peripheral device is configured to be installed in the vehicle, and equipped with one of first and second communication platforms. The first and second communication platforms are different. The second peripheral device is configured to be installed in the vehicle, and is equipped with another one of the first and second communication platforms. The communication interface is configured to support the first and second communication platforms, to be coupled to the first and second peripheral devices via respective first and second communication platforms, and to support bi-directional and selective communication between the first and second peripheral devices.

Other aspects of embodiments the invention will become apparent by consideration of the detailed description and accompanying drawings.

DETAILED DESCRIPTION

Figure 1:
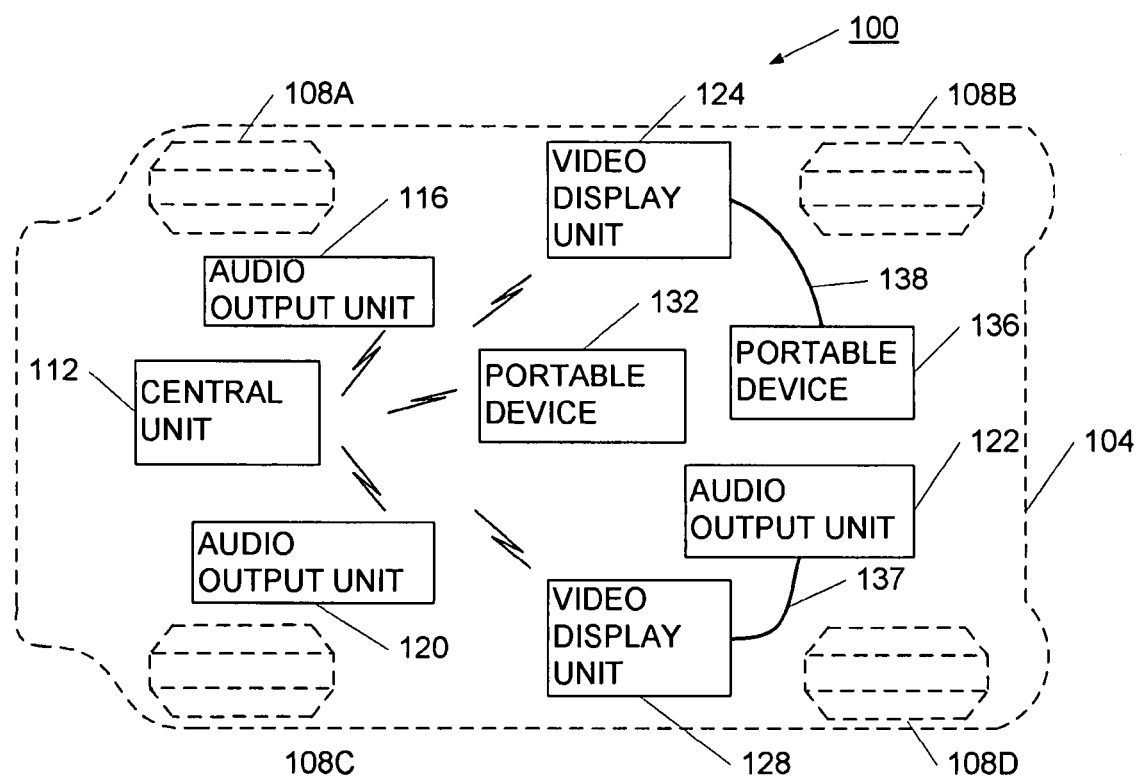
FIG. 1 shows a vehicle having an integrated multimedia system according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "processor" and "controller" may include or refer to both hardware and/or software. In addition, throughout the specification capitalized terms are used. Such terms are used to conform to common practices and to help correlate the description with the coding examples and drawings. However, no specific meaning is implied or should be inferred simply due to the use of capitalization.

Embodiments of the invention provide an interface control system that allows direct communication between a system of portable or peripheral multimedia devices having different communication interfaces or platforms in a vehicle. The interface control system includes a plurality of different communication platforms. The communication platforms can be wired and wireless. Each of the different communication platforms allows the interface control system to bi-directionally and selectively communicate with a multimedia device having a corresponding communication platform on the interface control system.

Exemplary portable or peripheral multimedia devices include, but are not limited to, computers, cell phones, personal-digital-assistants ("PDA"), digital cameras, camcorders, universal serial bus ("USB") storage devices, MP3 players, iPods, video displays, game consoles and stations, and the like. Exemplary wired communication interfaces or protocols include, but are not limited to, RCA audio/video ("AV") connections, digital visual interface ("DVI"), digital flat panel ("DFP") connections, Deutsches Institut für Normung e.V. ("DIN") connections, bayonet Neill-Concelman ("BNC") connections, DisplayPort connections, VESA enhanced video connections, banana plugs, high-definition multimedia interface ("HDMI"), USB, Ethernet, IEEE 802.3, IEEE 1394, and the like.

Exemplary wireless communication interfaces or protocols include, but are not limited to, wide area network ("WAN") communication interfaces or protocols, local area network ("LAN") communication interfaces or protocols, personal area network ("PAN") communication interfaces or protocols, and medium distance wireless protocols such as dedicated short range communications ("DSRC"). Exemplary WAN communication interfaces or protocols include, but are not limited to, WiBro, WiMax or IEEE 802.16e, and the like. Exemplary LAN communication interfaces or protocols include, but are not limited to, Wi-Fi including IEEE 802.11a, IEEE 802.11b, IEEE 802.11g, IEEE 802.11n, and the like. Exemplary PAN communication interfaces or protocols include, but are not limited to, Bluetooth, ZigBee, wireless USB ("WUSB"), certified wireless USB ("CWUSB"), ultra-wideband technology, and the like. The interface control system also allows communication between devices in different vehicles, between devices in a vehicle and external communication networks and services such as the Internet, global-positioning-systems ("GPS"), Galileo positioning systems, WiFi networks, dedicated short range communications ("DSRC"), WiMax networks, cellular networks, global-positioning-systems ("GPS") and/or Galileo satellite receivers, and the like.

FIG. 1 shows an integrated multimedia system 100 in a vehicle 104 according to the invention. In the embodiment shown, the vehicle 104 includes four wheels 108A, 108B, 108C, and 108D. In other embodiments, the vehicle 104 can also include a different number of wheels. The integrated multimedia system 100 includes a central control unit 112 and a plurality of portable or peripheral multimedia devices including audio output units 116, 120, and 122; video display units 124 and 128, and portable devices 132 and 136.

Although the central unit 112 is shown installed toward the front of the vehicle 104, the central unit 112 can be installed in other locations in the vehicle 104. The audio output units 116, 120, and 122 can include devices such as in-vehicle speakers and headsets that can be used by passengers in the vehicle 104. The video display units 124 and 128 can be installed in many locations such as the front dash, in seat backs, the vehicle ceiling, and the like. In the embodiment shown, the peripheral multimedia devices wirelessly communicate with the central unit 112 using low-power, high-speed ("LPHS") communication techniques. In other embodiments, the peripheral multimedia devices can communicate with the central unit 112 using other communication techniques. FIG. 1 shows the audio output unit 122 wired to the video display unit 128 with a cable 137, and the portable device 136 connected to the video display unit 124 via a wired connection 138 such as USB, audio/video cable, and the like.

Figure 2:
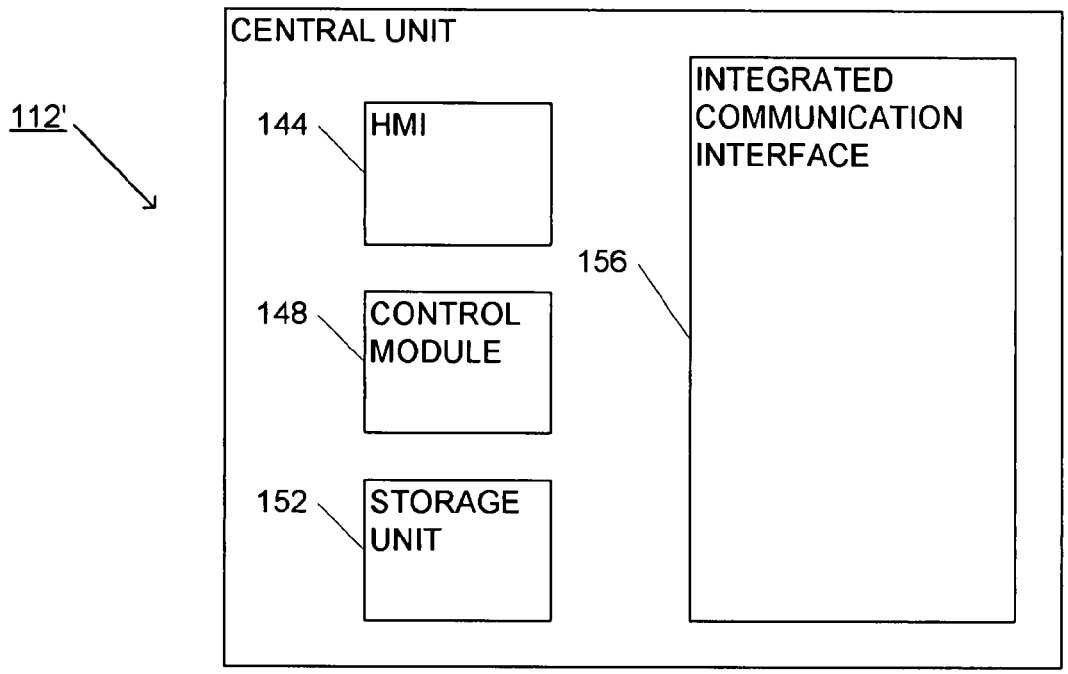
FIG. 2 shows an exemplary central unit for use with the integrated multimedia system of FIG. 1.

FIG. 2 shows an exemplary central unit 112' for use with the integrated multimedia system 100 of FIG. 1 in a block diagram format. In the embodiment shown, the central unit 112' includes a human-machine interface ("HMI") module 144, a control module 148, a storage unit 152, and an integrated communication interface 156. In some embodiments, the HMI module 144 includes a display such as an LCD with pushbuttons for displaying system control information and multimedia content. In other embodiments, the HMI module 144 includes a touch screen LCD. The storage unit 152 may include hard disk drives, random access memory ("RAM"), flash memory, digital video disk ("DVD") drive, compact disk ("CD") drive, DVD/CD writer, and the like. The storage unit 152 generally stores multimedia information, content, or files, such as music, pictures, movies, video files, audio files, electronic maps, and the like. The control module 148 generally includes a processor, an embedded processor, or a system-on-chip ("SoC") ASIC executing or running programs that responds and routes control requests received from the HMI 144 or remotely from audio output units 116, 120, or video display units 124, 128 via the integrated communication interface 156, which is described in greater detail hereinafter.

Figure 3:
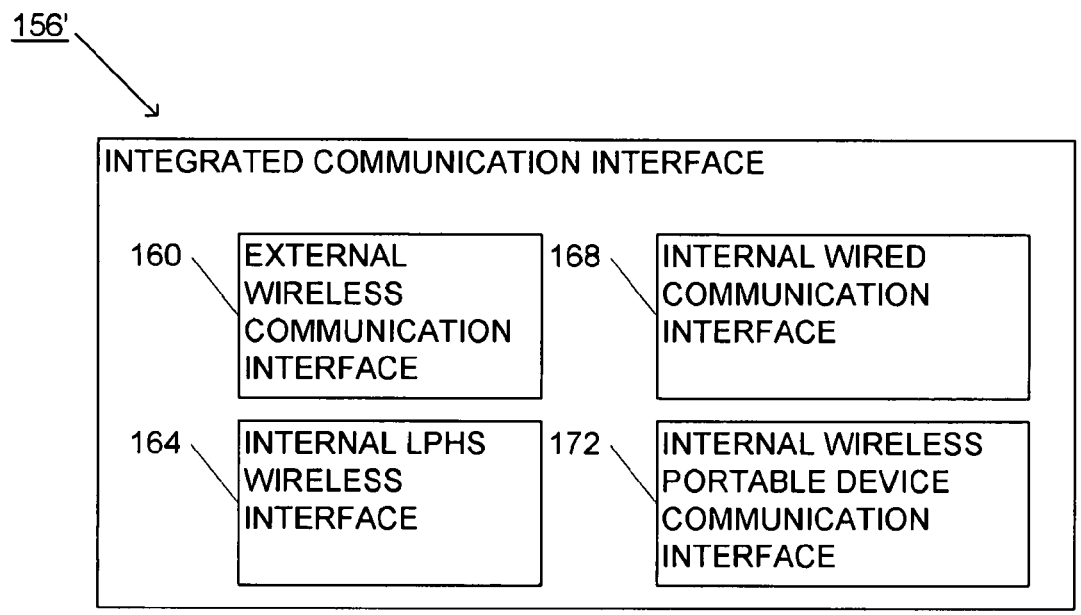
FIG. 3 shows an exemplary integrated communication interface for use with the central unit of FIG. 2.

FIG. 3 shows an exemplary integrated communication interface 156' for use with the central unit 112' of FIG. 2. In the embodiment shown, the integrated communication interface 156' includes an external wireless communication interface 160, an internal LPHS wireless interface 164, an internal wired communication interface 168, and an internal wireless portable device communication interface 172. When a request is received at the HMI 144 or at one of the peripheral multimedia devices in the vehicle 104, the external wireless communication interface 160 operates to establish a wireless communication link with external services and/or networks such as cellular networks and satellite networks, and with wireless communication protocols as described earlier. Once established, the central unit 112 can carry out external communications, such as vehicle-to-vehicle, vehicle-to-roadside, and vehicle-to-infrastructure communication. In this way, users of the vehicle 104 can exchange information such as safety information, roadside service points, or access the Internet and other services provided by network service providers.

The central unit 112' also allows internal wired and wireless communication through the internal LPHS wireless interface 164, the internal wired communication interface 168, and the internal wireless portable device communication interface 172. In the embodiment shown, the internal LPHS wireless interface 164 allows the central unit 112' and the peripheral multimedia devices to communicate using LPHS signals. The internal wired communication interface 168 allows the integrated communication interface 156 to be wired or connected with devices that require wired connections using platforms such as USB, IEEE 1394, audio/video cables, and the like. The internal wireless portable device communication interface 172 allows the integrated communication interface 156 to wirelessly communicate with wireless peripheral multimedia devices using some or all of the wireless communication platforms described. In this way, the peripheral multimedia devices can communicate directly with each other through the central unit 112'. The peripheral multimedia devices can also to communicate with external services and networks.

As discussed above, the central unit 112' communicates with the multimedia devices using various signals. The signals can be conditioned as necessary (e.g., filtered, amplified, or the like). Additionally, communicated signals as can transmit power, data, or both. As such, at least a portion of any particular communicated signal can include data (or information) and any particular signal can be broken into parts so that, for example, some data is sent to one destination and other data is sent to another destination.

Figure 4:
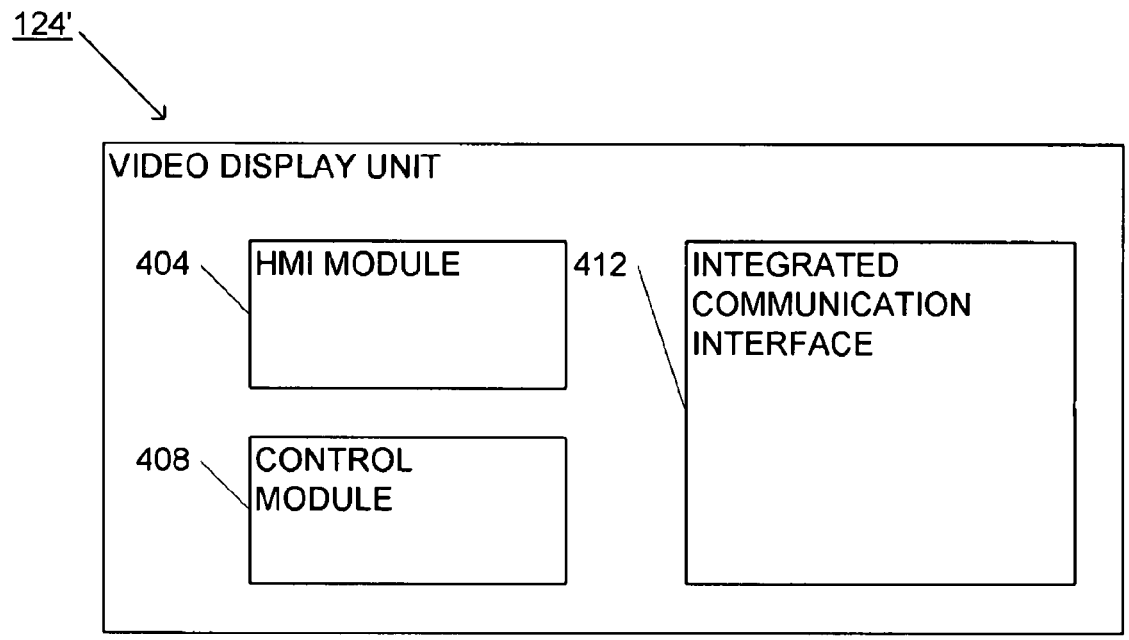
FIG. 4 shows an exemplary video display unit for use with the integrated multimedia system of FIG. 1.

FIG. 4 shows an exemplary video display unit 124' for use with the integrated multimedia system 100 of FIG. 1. Exemplary video display units include, but are not limited to, plasma video displays, CRT video monitors, LCDs, and the like. The video display unit 124' includes an HMI module 404, a control module 408, and an integrated communication module 412. In some embodiments, the HMI module 201 includes an LCD with pushbuttons in a frame around the display, or a touch-screen LCD, for obtaining and displaying control information, as well as multimedia content. The control module 202 includes a processor, an embedded processor such as system on chip ("SoC") executing or running programs that responds and routes control requests received directly from the HMI module 404 or remotely from the central unit 112 via an established wireless communication channel. For cost efficiency purposes, the control module 408 in some embodiments may contain hardware and/or software with smaller capacity than the control module 148 of FIG. 2.

Figure 5:
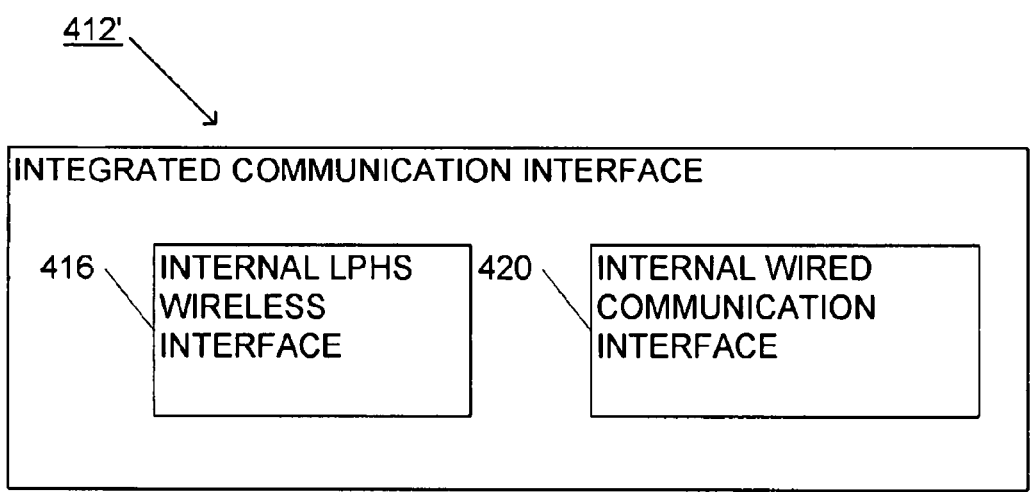
FIG. 5 shows an exemplary video display interface for use with the video display unit of FIG. 1.

In some embodiments, the integrated communication module 412 is generally configured to communicate with the central control unit 112, the video display units 124, 128, the audio output units 116, 120, 122, and the portable devices 132, 136. As shown in FIG. 5, an internal LPHS wireless interface 416 allows the video display units 124, 128 to wirelessly communicate with the central unit 112 and the audio output units 116, 120 using LPHS solutions. Similarly, personal portable devices 132, 136 with wireless LPHS capability can communicate with the video display units 124, 128 having the internal LPHS wireless interface 416. An internal wired communication interface 420 allows the video display units 124 and 128 to communicate with other peripheral multimedia devices that require wired connections.

Figure 6:
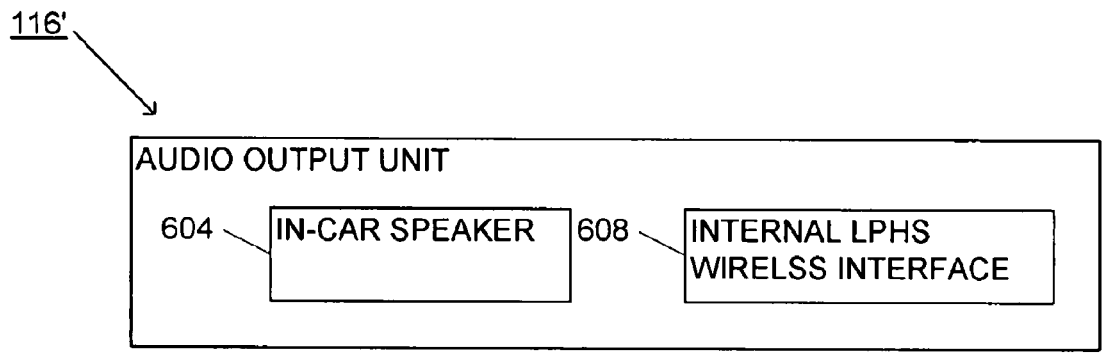
FIG. 6 shows a first exemplary audio output unit for use with the integrated multimedia system of FIG. 1.

FIG. 6 shows a first exemplary audio output unit 116' for use with the integrated multimedia system 100 of FIG. 1. In the embodiment shown, the audio output unit 116' includes an in-vehicle speaker 604 equipped with an internal wireless communication module 608. In operation, the central unit 112 or the video display units 124 wirelessly transmits an audio stream to the internal wireless communication module 608. After the internal wireless communication module 608 has received the audio stream, power from the vehicle 104 is delivered through power cables to drive the in-vehicle speaker 604. In some embodiments, the central unit 112 or the video display unit 124 also transmits the audio stream using LPHS solutions. In some embodiments, the central unit 112 also transmits control information such as audio volume along with the audio stream to the in-vehicle speaker 604 such that the speaker volume can be controlled at the central unit 112.

Figure 7:
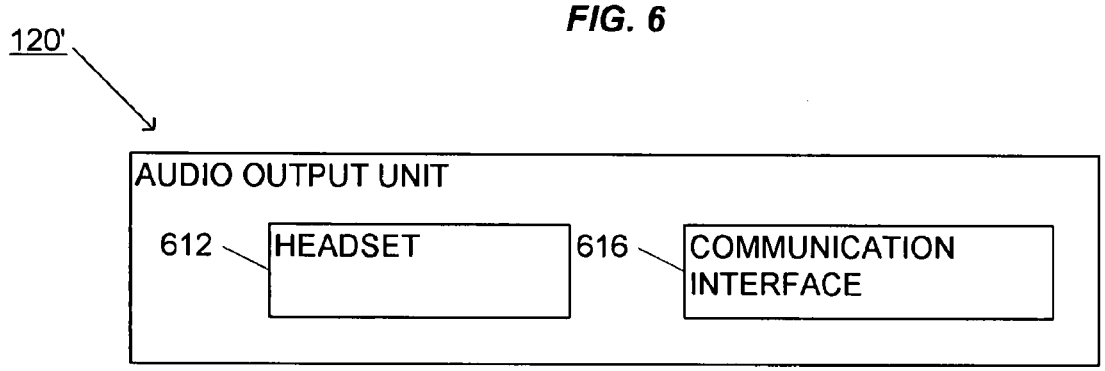
FIG. 7 shows a second exemplary audio output unit for use with the integrated multimedia system of FIG. 1.
Figure 8:
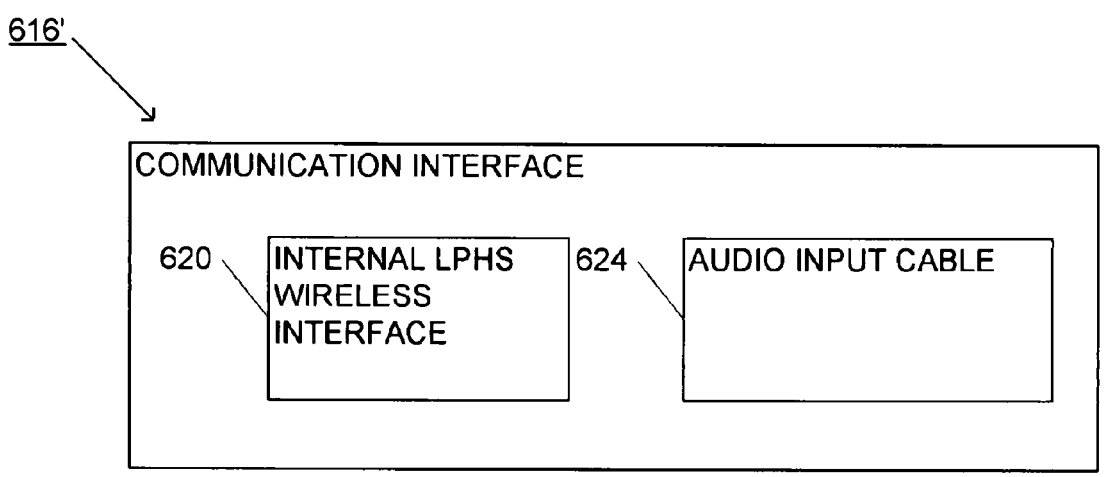
FIG. 8 shows an exemplary audio output interface for use with the second exemplary audio output unit of FIG. 7.

FIG. 7 shows a second exemplary audio output unit 120' for use with the integrated multimedia system 100 of FIG. 1. The second exemplary audio output unit 120' includes a headset speaker 612 to receive an input audio stream from a communication interface 616. FIG. 8 shows an exemplary audio display interface 616' for use with the second exemplary audio output unit 120' of FIG. 7. In the embodiment shown, the exemplary audio display interface 616' includes an internal LPHS wireless interface 620 that uses LPHS communication between the audio output unit 120', and the central unit 112 and the video display units 124 and 128. In some cases, the internal LPHS wireless interface 620 is battery-powered. The exemplary audio display interface 616' also optionally includes an audio input cable connection 624 allowing a wired connection. In this way, the headset 612 can receive audio stream from either the internal LPHS wireless interface 620 or the audio input cable connection 624.

In operation, users in the vehicle 104 can interact with the multimedia system 100 through the HMI interfaces 144 and 404, and through the integrated communication modules 156 and 412. For example, a user can couple the portable personal devices 132 and 136 either in a wired manner or wirelessly to the multimedia system 100. That is, the portable devices (e.g. 132 of FIG. 1) that are equipped with wireless communication capability can be wirelessly connected to the central unit 112 through the integrated communication module 156 with the wireless communication platforms described. Portable devices that are wirelessly connected to the integrated communication module 412 can set up virtual connections between the portable devices and the central unit 112 via the integrated communication modules 156 and 412. Portable devices that are not equipped with wireless communication capability (e.g., 136 of FIG. 1) can be directly connected to the integrated communication module 156 (168) or 412 (420) via wired connections as described.

Users can display multimedia files that are stored in the storage unit 152 by inputting requests via the HMI interfaces 144 and 404, or through a plurality of portable personal devices connected to the system 100. For example, the requests inputted through the HMI interface 144 are directly processed by the control module 148. In such a case, the requests inputted on the HMI interface 404 are routed to the central unit 112 via an wireless connection established between the integrated communication modules 156 and 412 for further processing. Similarly, the requests inputted on portable personal devices are routed to the central unit 112 via connection established as described earlier, and further processed by the central unit 112.

Depending on the types of multimedia services requested, content may be manipulated and/or transmitted differently. For example, content may be broadcast to all deployed video display units 124, 128; audio output units 116, 120, 122; and/or connected portable personal devices 132, 136. For another example, the content may be multicast to a select group of deployed video display units 124, 128; audio output units 116, 120, 122; and/or connected portable personal devices 132, 136. For yet another example, different content may be multicast or unicast to different groups (individual units) of deployed video display units 124, 128; audio output units 116, 120, 122; and/or connected portable personal devices 132, 136.

In a multimedia content exchanging and sharing operation, users can selectively share content between different devices, and between devices and the multimedia system 100. For example, users can upload multimedia files stored in portable personal devices to the storage unit 152 via the connection described earlier. These files can be used by other users later on. Similarly, users can also directly exchange multimedia files and/or content by first transmitting through a sender's connection with the central unit 112, then through a receiver's connection between the central unit 112 and a receiving device in a peer-to-peer or multicast manner. Users can also display multimedia content stored in one portable device on the HMI 144 of the multimedia system 100 or on other devices by first transmitting the multimedia content through a sender's connection with the central unit 112, and through a receiver's connection between the central unit 112 and a receiving device in a peer-to-peer or multicast manner. In these ways, portable devices can transparently communicate to each other even if they have different communication interfaces or platforms.

In an external network access operation, devices in a vehicle can selectively communicate with available wireless services and networks external to the vehicle via the respective central units 112. Particularly, users can directly access any external networks or services through the HMI modules 144, 404, or through portable devices connected to the multimedia system 100 as described earlier. In this way, users in a vehicle can request various services such as Internet and email accesses, online banking, video/music downloading, voice over IP, system software/firmware upgrading, localization- or location-based services ("LBS"), and the like.

In a vehicle-to-vehicle communication operation, vehicles that are equipped with the multimedia system 100 can communicate with each other via the respective integrated communication modules 156. Therefore, users in one vehicle can exchange information such as road conditions with neighboring vehicles. Users in different vehicles can also exchange and share multimedia content via the HMI modules 144 and 404, or, through portable devices connected to the respective multimedia systems 100.

Various features and advantages of the invention are set forth in the following claims.

What is claimed is:

1. An integrated system for interactive communication and multimedia support in a vehicle, the system comprising:
    a plurality of peripheral devices, each of the peripheral devices configured to be installed in the vehicle and to operate independently from the other peripheral devices;
    a central control unit configured to be installed in the vehicle and having a communication interface, the communication interface including first and second communication platforms that are different from each other and configured to communicate with the plurality of peripheral devices via at least one of the first and second communication platforms, each communication platform configured to support direct, bi-directional, and selective communication between each of the peripheral devices;
    the communication interface configured to allow one of the peripheral devices having one of the first and second communication platforms, to directly, bi-directionally, and selectively communicate with another one of the peripheral devices having a different one of the first and second communication platforms,
    wherein the central unit comprises a Human-Machine Interface ("HMI") module configured to interface between a user and the system, a storage unit configured to store multimedia content, and a control module configured to control operations of the system, and
    wherein the central unit is configured to receive a command from one of the peripheral devices and the HMI, wherein the command comprises one of unicast, multicast, and broadcast commands, and wherein the central unit is further configured to unicast, multicast, or broadcast multimedia content based on the command, and
    wherein the peripheral devices comprise a plurality of video display units, and wherein at least one of the video display units comprises an HMI module configured to interface between a user and the video display unit, a control module configured to control operations of the video display unit, and an integrated communication module configured to communicate with the communication interface, and
    wherein the integrated communication module of the video display unit is configured to communicate with a low-power, high-speed ("LPHS") internal wireless and wired signals.

2. The system of claim 1, wherein the first communication platform comprises a wide area network communication platform.

3. The system of claim 1, wherein the first communication platform comprises a local area network communication platform.

4. The system of claim 1, wherein the first communication platform comprises a personal area network communication platform.

5. The system of claim 1, wherein the first communication platform comprises a wired connection, and the second communication platform comprises a wireless connection.

6. An integrated system for interactive communication and multimedia support in a vehicle, the system comprising:
    a first peripheral device configured to be installed in the vehicle and equipped with one of first and second communication platforms, wherein the first and second communication platforms are different;
    a second peripheral device configured to be installed in the vehicle and equipped with another one of the first and second communication platforms, where the first and the second peripheral devices are configured to operate independently from each other;
    a communication interface that supports the first and second communication platforms, that is configured to communicate with the first and second peripheral devices via the first and second communication platforms, and to support direct, bi-directional, and selective communication between the first and second peripheral devices; and a central unit that includes a communication interface and comprises a Human-Machine Interface ("HMI") module configured to interface between a user and the system, a storage unit configured to store multimedia content, and a control module configured to control operations of the system, wherein the central unit is configured to receive a command from one of the peripheral devices and the HMI module, wherein the command comprises one of unicast, multicast, and broadcast commands, and wherein the central unit is further configured to unicast, multicast, or broadcast multimedia content based on the command, and wherein the first and second peripheral devices comprise first and second video display units, and wherein at least one of the first and second video display units comprises an HMI module configured to interface between a user and the at least one of the first and second video display units, a control module configured to control operations of the at least one of the first and second video display units, and an integrated communication module configured to communicate with the communication interface, and wherein the integrated communication module of the at least one of the first and second the video display units is configured to communicate with a low-power, high-speed ("LPHS") internal wireless and wired signals.

7. The system of claim 6, wherein the first communication platform comprises a wide area network communication platform.

8. The system of claim 6, wherein the first communication platform comprises a local area network communication platform.

9. The system of claim 6, wherein the first communication platform comprises a personal area network communication platform.

10. The system of claim 6, wherein the first communication platform comprises a wired connection, and the second communication platform comprises a wireless connection.

11. A method for interactive and direct communication between peripheral devices having respective first and second different communication platforms with an interface unit in a vehicle, the interface unit supporting the first and second communication platforms, the method comprising:

operating the peripheral devices independent from each other;

establishing a first connection between one of the first and second communication platforms on the interface unit and one of the peripheral devices having the first communication platform;

establishing a second connection between another one of the first and second communication platforms on the interface unit and another one of the peripheral devices having the second communication platform;

transmitting a signal from the one of the peripheral devices to the interface unit via the first connection;

selectively transmitting at least a portion of the signal from the interface unit to the another one of the peripheral devices via the second connection;

receiving the at least a portion of the signal at the another one of the peripheral devices with the second connection;

receiving another signal from the another one of the peripheral devices with the second connection in response to the at least a portion of the signal; and selectively transmitting at least a portion of the another signal from the interface unit to the one of the peripheral devices with the first connection, wherein the peripheral devices comprise a plurality of video display units, and wherein at least one of the video display units comprises a Human-Machine Interface ("HMI") module, and wherein transmitting a signal from the one of the peripheral devices comprises transmitting a signal from the one of the peripheral devices in response to a request entered at the HMI module, and wherein the signal comprises one of unicast, multicast, and broadcast signals, and wherein selectively transmitting at least a portion of the signal comprises one of unicasting, multicasting, and broadcasting multimedia content based on one of the respective unicast, multicast, and broadcast signals, and wherein the method further comprises
interfacing the at least one of the video display units through the HMI module,
controlling operations of the at least one of the video display units, and
transmitting at least one of the signal and the another signal with a low-power, high-speed ("LPHS") communication channel.

12. The method of claim 11, wherein the first connection comprises a wide area network connection.

13. The method of claim 11, wherein the first connection comprises a local area network connection.

14. The method of claim 11, wherein the first connection comprises a personal area network connection.

15. The method of claim 11, wherein the first connection comprises a wired connection, and the second connection comprises a wireless connection.

* * * * *